(12) United States Patent
Gouman et al.

(10) Patent No.: US 7,625,432 B2
(45) Date of Patent: Dec. 1, 2009

(54) PROCESS FOR THE REMOVAL OF CONTAMINANTS

(75) Inventors: Rudolf Robert Gouman, Amsterdam (NL); Rudolf Henri Max Herold, Amsterdam (NL); Thijme Last, Amsterdam (NL); Bernardus Josephus Maria Manshande, Amsterdam (NL); Cornelis Jacobus Smit, Amsterdam (NL)

(73) Assignee: Shell Oil Company, Houston, TX (US)

( * ) Notice: Subject to any disclaimer, the term of this patent is extended or adjusted under 35 U.S.C. 154(b) by 253 days.

(21) Appl. No.: 11/920,898

(22) PCT Filed: May 22, 2006

(86) PCT No.: PCT/EP2006/062484

§ 371 (c)(1),
(2), (4) Date: Nov. 21, 2007

(87) PCT Pub. No.: WO2007/093225

PCT Pub. Date: Aug. 23, 2007

(65) Prior Publication Data

US 2009/0234030 A1    Sep. 17, 2009

(30) Foreign Application Priority Data

May 23, 2005   (EP)   .................... 05253169

(51) Int. Cl.
*B01D 47/00* (2006.01)
*C07C 27/26* (2006.01)
(52) U.S. Cl. ............................ 95/232; 95/235; 518/722
(58) Field of Classification Search .................. 95/232, 95/235; 518/722
See application file for complete search history.

(56) References Cited

U.S. PATENT DOCUMENTS

| 4,088,735 | A | * | 5/1978 | Bratzler et al. | ............... 423/219 |
| 4,189,307 | A | * | 2/1980 | Marion | ...................... 48/197 R |
| 4,201,751 | A |   | 5/1980 | Holter et al. | ................. 423/210 |
| 4,711,648 | A | * | 12/1987 | Konkol et al. | .................. 95/232 |
| 2004/0146584 | A1 |   | 7/2004 | Therani | ...................... 424/648 |

FOREIGN PATENT DOCUMENTS

| DE | 10141193 | 3/2003 |
| EP | 305047 | 3/1989 |
| EP | 499095 | 8/1992 |

OTHER PUBLICATIONS

International Search Report dated Jun. 28, 2006 (PCT/EP2006/062484).

* cited by examiner

*Primary Examiner*—Porfirio Nazario Gonzalez
(74) *Attorney, Agent, or Firm*—Charles W. Stewart

(57) ABSTRACT

A process for the reduction of carbonyl sulfide (COS) in a gas stream is described. It comprises contacting the gas stream with an iron oxide-based material. The present invention relates to the removal of COS from any type of gas stream, in particular those which include one or more of the group comprising ethane, methane, hydrogen, carbon dioxide, hydrogen cyanide, ammonia, hydrogen sulfide, and noble gases. These include natural gas, and in particular syngas. Syngas is useable in a Fischer-Tropsch process. The present invention provides a simple but effective process for the reduction of COS, especially with a material that can easily be located in existing guard beds—avoiding any re-engineering time and costs. The iron oxide-based materials can also be useable against other impurities, providing a single bed solution.

20 Claims, No Drawings

PROCESS FOR THE REMOVAL OF CONTAMINANTS

PRIORITY CLAIM

The present application claims priority of European Patent Application No. 05253169.6 filed 23 May 2005.

The present invention relates to a process for the removal of hydrogen sulfide, hydrogen cyanide and carbonyl sulfide (COS) from a synthesis gas stream, particularly a synthesis gas stream for use in Fischer-Tropsch reactions.

The Fischer-Tropsch process can be used for the conversion of hydrocarbonaceous feedstocks into liquid and/or solid hydrocarbons. The feedstock (e.g. natural gas, associated gas and/or coal-bed methane, (residual) crude oil fractions, biomass or coal) is converted in a first step into a mixture of hydrogen and carbon monoxide (this mixture is often referred to as synthesis gas or syngas). The synthesis gas is then converted in a second step over a suitable catalyst, especially an iron or cobalt catalyst, at elevated temperature and pressure into paraffinic compounds ranging from methane to high molecular weight molecules comprising up to 200 carbon atoms, or, under particular circumstances, even more.

In the case that the synthesis gas is made from a natural product, e.g. biomass, peat etc., the synthesis gas usually includes a number of impurities. Fossil feedstock (e.g. natural gas, associated gas coal etc.) also contains impurities. These impurities are not removed by the partial oxidation of the feedstock to form the syngas. The main impurities in the synthesis gas are hydrogen sulfide, hydrogen cyanide, ammonia, and carbonyl sulfide, sometimes also termed carbon oxysulfide and generally known by the term COS. It is generally desired to remove these impurities prior to use of the syngas in a Fischer-Tropsch reaction vessel, as at least the hydrogen sulfide and COS reduce the effectiveness of the generally used catalysts in Fischer-Tropsch processes, usually by poisoning the catalysts. In addition, also trace amounts of hydrogen cyanide, e.g. up till 500 ppbv, especially up till 100 ppbv, may be removed in the process of the invention.

Presently, the level of ammonia can be wholly or substantially reduced by the use of scrubbers. In this way also part of the hydrogen cyanide will be removed. The syngas is then fed through a zinc oxide guard bed, optionally also containing alumina and active carbon, to reduce the hydrogen sulfide content. Whilst some removal of the COS content in the syngas can also be achieved by these cleaning processes, it is an object of the present invention to further reduce the COS content of the syngas as well as the HCN and $H_2S$ content, to provide optimal guarding of especially Fischer-Tropsch, and indeed other reaction, catalysts.

Thus, the present invention provides a process for removing COS hydrogen sulfide and hydrogen cyanide from a synthesis gas stream containing these compounds comprising the step of:

contacting the gas stream with an iron oxide-based material.

The iron oxide-based material preferably includes at least one iron (II) oxide, and at least one iron (III) oxide, more preferably a mixture of the two types of iron oxide. Iron oxide in the form of $Fe_3O_4$ may also be present.

Preferably, the iron oxide based material comprises at least 70% iron oxide(s), in whichever form or forms, more preferably between 80 and 95 wt %, especially approximately 80% iron oxide(s), by weight.

The iron oxide-based material may also include one or more chromium oxides, preferably chromium (III) oxide. The amount of chromium oxide is suitably between 2 and 25 wt % based on iron oxide, preferably between 4 and 20 wt %, more preferably between 6 and 15 wt %.

The iron oxide-based material may also include a promoter such as copper oxide and the like. The amount of promoter oxide is suitably between 0.1 and 10 wt % based on iron oxides, preferably between 0.5 and 8 wt %, more preferably between 1 and 6 wt %. The iron oxide material may contain a carrier, e.g. a refractory oxide (e.g. alumina, silica, titania) or carbon. The carrier may be present in any amount between 1 and 95 wt %, suitably between 20 and 80 wt %. In a preferred embodiment the amount in between 0 and 50 wt %, preferably between 0 and 25 wt %, as this results in a high absorption capacity.

The iron oxide material could have the general composition

| | |
|---|---|
| Iron (III) oxide | 75-85% |
| Chromium (III) oxide | 6-9% |
| CuO | 1-4% |

The process is preferably carried out in the presence of water and/or carbon dioxide (additional to any carbon dioxide in the gas stream). The water is preferably present in the amount of up to 5 vol %, preferably up to 1% volume (of the gas stream) preferably in the amount of approximately 0.2% v.

The iron oxide(s) in the iron oxide-based material could be provided in any suitable form known in the art. Providing such material in a finely divided form increases its surface area, and such materials are also often provided on a support material.

Any suitable form, shape or design of the iron oxide-based material could be used, which allows contacting of the gas stream with the active component(s). Moreover, it is desired to provide the iron oxide-based material in a form which is easy to handle, in particular in loading and unloading the material from a suitable reactor, position or site. Pressing the iron oxide-based material provides one suitable form of the material. One pressed form includes tablets, which tablets are then relatively easily loadable and unloadable from a reaction vessel through which the gas stream can pass.

The gas space velocity may be similar to current processes, for example in the range 1,000-100,000/h, preferably approximately 10-20,000/h.

The process of the present invention is preferably carried out at a temperature in the range 20-180° C., preferably 40-150° C., and more preferably 70-90° C.

The process of the present invention can also be carried out at a pressure of between approximately 1-120 bar, more preferably 5-100 bar, more preferably 10-80 bar, and more preferably 20-60 bar.

The present invention also provides a gas stream whenever prepared by a process as herein defined, use of such a gas stream in a hydrocarbon synthesis process, and such a process using such a gas stream.

Examples of the present invention will now be defined by way of example only.

The Fischer-Tropsch synthesis is well known to those skilled in the art and involves synthesis of hydrocarbons from a gaseous mixture of hydrogen and carbon monoxide, by contacting that mixture at reaction conditions with a Fischer-Tropsch catalyst.

Fischer-Tropsch catalysts are known in the art, and typically include a Group VIII metal component, preferably cobalt, iron and/or ruthenium, more preferably cobalt. Typically the porous catalyst element and each porous catalyst element comprise a carrier material such as a porous inorganic refractory oxide, preferably alumina, silica, titania, zirconia or mixtures thereof.

The catalytically active material may be present together with one or more metal promoters or co-catalysts. The promoters may be present as metals or as the metal oxide, depending upon the particular promoter concerned. Suitable promoters include oxides of metals from Groups IIA, IIIB, IVB, VB, VIIB and/or VIIB of the Periodic Table, oxides of the lanthanides and/or the actinides. Preferably, the catalyst comprises at least one of an element in Group IVB, VB and/or VIIB of the Periodic Table, in particular titanium, zirconium, maganese and/or vanadium. As an alternative or in addition to the metal oxide promoter, the catalyst may comprise a metal promoter selected from Groups VIIIB and/or VIII of the Periodic Table. Preferred metal promoters include rhenium, platinum and palladium.

A most suitable catalyst material comprises cobalt and zirconium as a promoter. Another most suitable catalyst comprises cobalt and maganese and/or vanadium as a promoter.

References to the Periodic Table and groups thereof used herein refer to the previous IUPAC version of the Periodic Table of Elements such as that described in the 68th Edition of the Handbook of Chemistry and Physics (CPC Press).

For proper operation of such catalysts, optimal guarding against hydrogen cyanide, hydrogen sulfide and COS is imperative. Concentrations of these contaminants, possibly in combination of ammonia, even at concentrations below 100 ppbv, can still poison the catalysts. Whilst currently employed ammonia scrubbers, hydrogen cyanide scrubbers and zinc oxide guard beds can be effective at substantially reducing the ammonia, hydrogen cyanide and hydrogen sulfide contents, it is now preferred to seek levels of these contaminants of less than 10 ppbv for hydrogen cyanide, 10 ppbv for hydrogen sulfide and 2 ppbv for COS. Certainly this COS level is not achievable with current guard beds. COS levels in a usual gas stream can be less than 1000 ppmv, suitably less than 200 ppmv, and even less than 25 ppmv. Hydrogen cyanide may be present in amounts up till 500 ppbv, suitably less than 200, more suitably less than 25 ppmb. Hydrogen sulfide may be present in amounts up to 500 ppmv, suitably less than 100 ppmv, more suitably less than 5 ppmv. These levels, however, should be further reduced.

According to the process of the present invention it is now possible to remove COS, HCN and $H_2S$ from syngas by means of one guard bed as described in the main claim.

To determine whether materials can function in guard beds, it is necessary to test them at conditions closely resembling the full scale industrial environment. All the following experiments were conducted by employing a micro flow unit where the reactor was filled with guard bed material and subsequently exposed to a gas stream of syngas containing water, nitrogen, carbon dioxide and the impurities herein described. The experiments were conducted in a multipurpose gas treating micro flow unit. The reactor had an internal diameter of 15 mm and was employed with a centrally placed thermowell with a diameter of 4 mm. The catalyst was "diluted" with inert SiC particles (0.8 mm) to reduce wall effects. Approximately 10 ml of catalyst was used. A grade of this material between 0.7 and 1.0 mm was used. Such material could be obtained from larger material forms, once crushed and sieved. The GHSV was approximately 14,400/h which is approximately the same as that employed in commercial Fischer-Tropsch plants.

Other parameters for the experiments were: pressure at 46 bar, temperature at 70° C., gas velocity at 140/hr. The gas composition of the syngas stream was CO 34.5v, $H_2$ 59.6%, $H_2O$ 0.2% v, $N_2$ 3.4% v, $CO_2$ 2.4% v, and HCN 33 ppmv.

The COS feed was 4 ppmv, and the COS uptake capacity was regarded as 1.2 wt %. XRF analysis of the guard bed material after use showed a sulfur percentage weight increase of 1.55 wt %, confirming the amount of sulfur absorbed by the guard bed material, and hence the degree of COS removal, the source of the sulfur.

The analysis of the feed to the reactor was not required as the gas mixture was made via the controlled addition of the individual components using calibrated mass flow controllers and a calibrated injection pump. However, the hydrogen cyanide, CO (and $CO_2$ in some cases) content of the feed was checked on a regular basis by on-line GC analysis.

The uptake capacity of the guard bed material for HCN, COS or $H_2S$ was calculated based on breakthrough time, i.e. the time after which COS was no longer significantly adsorbed, such that COS was then detected downstream. Because no correction was made for mass transfer zone, the breakthrough time was considered as the average bed adsorption capacity. This average capacity without mass transfer zone correction was calculated by the amount of material adsorbed until breakthrough, divided by the amount of adsorption material.

In this experiment, no COS was detected downstream for nearly 20 hours. The breakthrough was deemed to occur when more than a "zero" amount of COS at ppmv level started to grow in a continuous manner.

The guard bed material had the composition:

| | |
|---|---|
| Iron (III) oxide | 80 wt % |
| Chromium (III) oxide | 8.5 wt % |
| Carbon | 4 wt % |
| CuO | 2 wt % |

Such a material is available from Sud Chemie, Germany. It can also be made by mixing the individual components, optionally mixing and/or milling the mixture, and, optionally, shaping the mixture according to methods known in the art.

It is believed that HCN removal and $H_2S$ can function independently and experiments conducted to determine the influence of high concentrations of $H_2S$ and COS on the HCN uptake capacity verify this. According to XRD analysis, $H_2S$ is most likely converted to iron (II) sulfide (FeS). Iron sulfide is a material that, in the presence of moisture and air, is oxidized to iron (III) hydroxide and sulphur.

The movement of the COS hydrolysis equilibrium (described above), $$COS + H_2O \rightarrow H_2S + CO_2$$

to the right is promoted by the presence of the chromium oxide. It is considered that the hydrogen sulfide produced in the COS hydrolysis equilibrium reacts with iron to form iron (II) sulfide. This reaction is irreversible, such that the COS hydrolysis equilibrium is forced to the right, and in this manner, the COS is removed from the gas stream.

It was found that the iron oxide-based material reduced the COS concentration in the above experiment to at most 1 ppmv, and under industrial conditions, this is a significant reduction in the amount of COS. Under a simulated conditions for a Fischer-Tropsch reduction with a hydrogen cyanide feed of 33 ppmv and a COS feed of 20 ppmv, the iron oxide-based material described above had a COS uptake capacity of 1.1 wt %.

The same guard bed material was tested under large scale industrial conditions in a plant over several months at ppbv levels and through a single radial flow bed. The COS feed level generally ranged between 6-16 ppbv. The COS output level generally went up and down in harmony with the variation in COS feed level, but was measured in the range 2-7 ppbv—a reduction generally of over 50%.

After approximately 4 months, the COS feed concentration was significantly reduced by the deliberate reduction in sulfur introduction upstream. With less sulfur introduction, there is less hydrogen sulfide and COS creation. The COS feed level was held generally at 3-4 ppbv, whilst the COS output level immediately dropped to 1-2 ppbv. This confirmed the ability of the present invention to provide a reduction in the amount of COS in the gas stream of 50%, with achievable residual COS in the gas stream after the process being less than 2 ppbv, and possibly less than 1 ppbv.

The present invention relates to the removal of COS from any type of gas stream, in particular those which include one or more of the group comprising ethane, methane, hydrogen, carbon dioxide, hydrogen cyanide, ammonia, hydrogen sulfide, and noble gases. These include natural gas, associated gas, coalbed methane and, in particular, syngas. Syngas is useable in a Fischer-Tropsch process as hereinbefore described, especially where the hydrogen to carbon dioxide ratio is between approximately 0.2-10, and more preferably in the range 1.4-2.4.

The process of the present invention can be part of other cleaning or guarding processes or treatments, such as those for reducing hydrogen cyanide, hydrogen sulfide, and ammonia in the gas stream, either simultaneously, or serially. Such includes zinc oxide treatments, or treatment with the same or similar iron oxide-based materials herein described.

Using the same material in more than one cleaning or guard bed provides additional advantages. If one guard bed fails, there is immediate 'back up' to maintain guard of the catalyst material, which material is generally much more expensive than guard bed material. This back-up helps in terms of safety as well as catalyst preserver. It also allows a guard bed to be off-line for other reasons, such as reloading, regeneration, cleaning, servicing or emergencies, whilst the other(s) guard bed is maintained and the overall catalytic process continues. Using individual guard bed materials for different impurities requires the catalytic process to stop every time any guard bed material or guard bed unit must be off-line or malfunctions.

The gas stream may undergo the process of the present invention either once or a plurality of times, preferably in a serial manner, so as to continue to reduce the COS content.

Preferably the reduced-COS gas stream prepared by the present invention is useful in a number of chemical reactions, in particular in Fischer-Tropsch reactions or processes.

The present invention provides a simple but effective process for the removal of COS from a gas stream, especially with a material that can easily be located in existing guard beds—avoiding any re-engineering time and costs. The iron oxide-based materials can also be useable against other impurities, providing a single solution.

The process according to the present invention is especially suitable for the removal of trace amounts of carbonyl sulfide and optionally trace amounts of hydrogen cyanide. Bulk removal of sulphur compounds from gas streams, especially natural gas etc. is suitably done by a washing process using aqueous amine solutions. In the case that the trace contaminants are to be removed from synthesis gas, it is preferred to removed bulk sulphur compounds from the natural gas feed stream before conversion into synthesis rather than from the synthesis gas.

The washing process involves washing the feed gas stream with an aqueous amine solution and optionally a physical solvent. The use of aqueous amine solutions comprising a physical solvent for removing so-called acidic gases as hydrogen sulfide and optionally carbon dioxide and/or COS from a gas stream containing these compounds has been described. See for instance A. L. Kohl and F. C. Riesenfeld, 1974, Gas Purification, 2nd edition, Gulf Publishing Co. Houston and R. N. Maddox, 1974, Gas and Liquid Sweetening, Campbell Petroleum Series.

This washing process is at least partly based on carbon dioxide and hydrogen sulfide being highly soluble under pressure in certain solvents, and then being readily releasable from solution when the pressure is reduced as further discussed below.

On an industrial scale there are chiefly two categories of absorption solvents, depending on the mechanism to absorb the acidic components: chemical solvents and physical solvents. Each solvent has its own advantages and disadvantages as to features as loading capacity, kinetics, regenerability, selectivity, stability, corrosivity, heating/cooling requirements etc.

Chemical solvents which are useful in the process of the present invention are primary, secondary and/or tertiary amines derived alkanolamines, especially amines are derived from ethanolamine, especially monoethanol amine (MEA), diethanolamine (DEA), triethanolamine (TEA), diisopropanolamine (DIPA) and methyldiethanolamine (MDEA) or mixtures thereof.

Physical solvents which are suitable in the process of the present invention are cyclo-tetramethylenesulfone and its derivatives, aliphatic acid amides, N-methyl-pyrrolidone, N-alkylated pyrrolidones and the corresponding piperidones, methanol, ethanol and mixtures of dialkylethers of polyethylene glycols or mixtures thereof.

The mixed systems show good absorption capacity and good selectivity against moderate investment costs and operational costs. They perform very well at high pressures, especially between 20 and 90 bara. Preferably in the hydrogen sulfide removal step between 90 and 100 mol % of the hydrogen sulfide based on total amount of hydrogen sulfide present in the gas stream is removed, preferably between 95 and 100 mol %. More especially, hydrogen sulfide is removed to a level of less than 10 ppmv, more especially to a level of less than 5 ppmv.

The preferred physical solvent is sulfolane. The preferred amine is a secondary or tertiary amine, preferably an amine compound derived from ethanol amine, more especially DIPA, DEA, MMEA (monomethyl-ethanolamine), MDEA, or DEMEA (diethyl-monoethanolamine), preferably DIPA or MDEA.

In one way, the aqueous amine washing solution comprises 15 to 60 wt % of water and 40 to 85 wt % of an amine, based on total solution weight. Alternatively, the aqueous amine solution comprises 10 to 50 wt % of water, and optionally 10 to 45 wt % of a physical solvent, and 20 to 65 wt % of amine, all based on total solution weight.

In one embodiment of the present invention, the aqueous amine solution comprises 20 to 35 wt % of water, 20 to 35 wt % of a physical solvent and 40 to 55 wt % of an amine, all based on total solution weight.

The total solution weight of the constituents mentioned above should always total 100%.

Suitably the aqueous amine washing process of step (i) is carried out at a temperature of at least 20° C., preferably between 25 and 90° C., more preferably between 30 and 55° C., and at a pressure between 15 and 90 bara.

The laden solvent obtained in the washing process contains hydrogen sulfide, mercaptans and optionally some carbon dioxide and carbonyl sulfide. It may also contain appreciable amounts of dissolved non-acid components from the gas mixture to be purified, e.g. hydrocarbons, carbon monoxide and/or hydrogen. Suitably, the laden solvent is regenerated in a regenerator at relatively low pressure and high temperature. A lean solvent is obtained and a gas stream comprising hydrogen sulfide, mercaptans and optionally carbon dioxide and carbonyl sulfide. It may be advantageous to remove the non-acid components and any carbon dioxide at least partially from the laden solvent by flashing to a pressure which is higher than the sum of the partial pressures belonging to the hydrogen sulfide and carbon dioxide present in the laden solvent. In this way only small amounts of hydrogen sulfide and any carbon dioxide are released from the solvent together with the non-acid compounds. In a second step the laden solvent can be flashed to a pressure below the sum of the partial pressures of the hydrogen sulfide and any carbon dioxide present in the laden solvent at the prevailing temperature, i.e. to a pressure usually between 1 and 5 bara. Flashing at atmospheric pressure is preferred. The temperature in the last flashing operation is suitably in the range of from 50 to 120° C., preferably between 60 and 90° C.

In a preferred embodiment of the present invention the raw synthesis gas is first cleaned by means of scrubbing with water. Scrubbing process are well known in the literature. When scrubbing synthesis gas at least 90%, usually even 99% of soot, salts, and ammonia is removed from the synthesis gas. In addition up till 25%, preferably up till 50% of the HCN is removed. The single iron oxide based guard bed will result in the removal of the remaining HCN, $H_2S$ and COS.

The synthesis gas stream to be cleaned according to this process suitably comprises at least 50 vol % based on the whole stream of hydrogen and carbon monoxide together, preferably at least 70 vol %, more preferably at least 85 vol %. Further, nitrogen may be present, suitably up till 20 vol %, preferably up till 10 vol %, carbon dioxide may be present, suitably up till 20 vol %, preferably up till 10 vol % and methane may be present, suitably up till 20 vol %, preferably up till 10 vol %. In addition, usually up till 5 vol % each, more usually up till 2 vol % each, of trace components may be present, e.g. neon, helium, argon, ethane, propane.

That which is claimed is:

1. A process for removing carbonyl sulfide (COS), hydrogen sulfide and hydrogen cyanide from a synthesis gas stream containing these compounds comprising the step of:
    contacting the synthesis gas stream with an iron oxide-based material including at least one iron (II) oxide, at least one iron (III) oxide, and one or more chromium oxides.

2. A process as claimed in claim 1 wherein the iron oxide-based material comprises at least 70% iron oxide(s).

3. A process as claimed in claim 1 wherein the iron oxide-based material includes chromium (III) oxide.

4. A process as claimed in claim 1 wherein the process is carried out in the presence of water.

5. A process as claimed in claim 1 wherein the iron oxide-based material is in a pressed form.

6. A process as claimed in claim 1 carried out at a temperature in the range 20-180° C.

7. A process as claimed in claim 1 wherein the iron oxide-based material includes a promoter.

8. A process as claimed in claim 1 for the removal of each of COS, HCN and $H_2S$ in the synthesis gas stream of at least 50% of each individual stream.

9. A process as claimed in claim 1 wherein the amount of each of COS, HCN and $H_2S$ in the synthesis gas stream after the process is less than 2 ppbv.

10. A process for the synthesis of hydrocarbon products from a hydrocarbonaceous feedstock, comprising converting the hydrocarbonaceous feedstock into a gas stream for a hydrocarbon synthesis reaction in which the gas stream has been made by the process as defined in claim 1.

11. A process as claimed in claim 1 wherein the iron oxide(s) in the iron oxide-based material is in a finely divided form, the finely divide material comprising iron oxide(s) supported on a support material.

12. A process for the synthesis of hydrocarbon products from a hydrocarbonaceous feedstock, comprising converting the hydrocarbonaceous feedstock into a gas stream for a hydrocarbon synthesis reaction in which the gas stream has been made by the process as defined in claim 2.

13. A process for the synthesis of hydrocarbon products from a hydrocarbonaceous feedstock, comprising converting the hydrocarbonaceous feedstock into a gas stream for a hydrocarbon synthesis reaction in which the gas stream has been made by the process as defined in claim 3.

14. A process for the synthesis of hydrocarbon products from a hydrocarbonaceous feedstock, comprising converting the hydrocarbonaceous feedstock into a gas stream for a hydrocarbon synthesis reaction in which the gas stream has been made by the process as defined in claim 4.

15. A process for the synthesis of hydrocarbon products from a hydrocarbonaceous feedstock, comprising converting the hydrocarbonaceous feedstock into a gas stream for a hydrocarbon synthesis reaction in which the gas stream has been made by the process as defined in claim 5.

16. A process for the synthesis of hydrocarbon products from a hydrocarbonaceous feedstock, comprising converting the hydrocarbonaceous feedstock into a gas stream for a hydrocarbon synthesis reaction in which the gas stream has been made by the process as defined in claim 6.

17. A process for the synthesis of hydrocarbon products from a hydrocarbonaceous feedstock, comprising converting the hydrocarbonaceous feedstock into a gas stream for a hydrocarbon synthesis reaction in which the gas stream has been made by the process as defined in claim 7.

18. A process for the synthesis of hydrocarbon products from a hydrocarbonaceous feedstock, comprising converting the hydrocarbonaceous feedstock into a gas stream for a hydrocarbon synthesis reaction in which the gas stream has been made by the process as defined in claim 8.

19. A process for the synthesis of hydrocarbon products from a hydrocarbonaceous feedstock, comprising converting the hydrocarbonaceous feedstock into a gas stream for a hydrocarbon synthesis reaction in which the gas stream has been made by the process as defined in claim 9.

20. A process for the synthesis of hydrocarbon products from a hydrocarbonaceous feedstock, comprising converting the hydrocarbonaceous feedstock into a gas stream for a hydrocarbon synthesis reaction in which the gas stream has been made by the process as defined in claim 10.

* * * * *